United States Patent Office 3,412,714
Patented Nov. 26, 1968

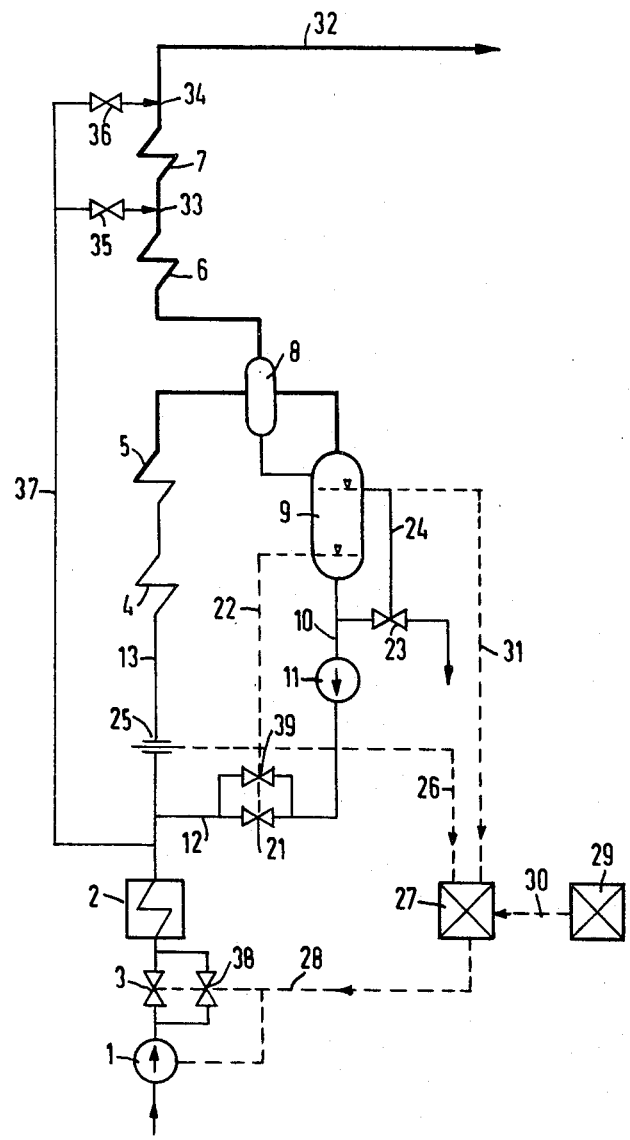

3,412,714
CONTROL SYSTEM FOR ONCE-THROUGH
TYPE BOILER
Rupprecht Michel, Erlangen, Germany, assignor to Siemens Aktiengesellschaft, a corporation of Germany
Continuation of application Ser. No. 435,316, Feb. 25, 1965. This application Apr. 20, 1967, Ser. No. 632,446
Claims priority, application Germany, Feb. 28, 1964, S 89,737
5 Claims. (Cl. 122—406)

ABSTRACT OF THE DISCLOSURE

Once-through boiler includes sensors which sense quantity of water supplied to evaporation stage and level of separated water received in a container from a steam trap. A circulation conduit connects the container to a point between a feed pump and the evaporator stage. A regulator responsive to the sensors regulates the feed water supplied to the evaporator stage so that the combined feed water and separated water supplied during start-up, shut-down and partial-load operation to the evaporator stage is at a constant value substantially 40% of the water supplied during full-load operation to the evaporator stage.

This application is a continuation of application Serial No. 435,316, filed February 25, 1965, now abandoned.

My invention relates to boilers of the "once-through" or "series" type. More particularly, it relates to such once-through type boilers which are equipped for start-up, shut-down and partial-load operation.

In once-through type boilers equipped for start-up, shut-down and partial-load operation, there may e included a separator vessel in which a preheated water steam mixture is received and wherein steam is separated from the water in the mixture, the separated water draining into a tank serially connected to the separator vessel. The water in the tank is combined with and circulated together with the feed water through the boiler, such circulating suitably being effected by a circulating pump associated with the tank.

Of necessity, the level of separated water in the tank varies greatly although it is desirable to maintain a relatively steady given level, such level being difficult to regulate particularly because of the long flow path of water in the boiler before it reaches the tank. In addition, to ascertain the respective quantities of feed water and circulating water, i.e., tank water, separate flow quantity measurements have to be made.

Accordingly, it is an important object of this invention to provide in a once-through type boiler equipped with a steam-water separator vessel and associated water tank for start-up, shut-down and partial-load operation, means for satisfactorily regulating the water level in the tank.

It is another object to provide means for satisfactorily regulating the water level in the tank without requiring the need for performing a quantity measurement in the circulating line from the tank.

Generally speaking and in accordance with the invention, there is provided in a "once-through" type boiler which includes a preheating stage for preheating water fed to the boiler, a superheating stage for superheating the steam produced in the preheating stage, a separator stage disposed intermediate the preheating and superheating stage for separating the water from the steam in the output produced from the preheating stage, a tank coupled to the separator stage for receiving the separated water and a circulating pump and line coupled between the tank and an intermediate point in the preheating stage for combining the separated water with the fed water, the improvement which comprises a valve disposed in the circulating line between the pump and the aforesaid intermediate point and responsive to the level of water in the tank for regulating such level.

To enable a monitoring of the quantity comprising the sum of both the fed water and the separated, i.e., circulating water being passed through the preheating stage distal to the aforesaid intermediate point, such intermediate point is located proximal to a quantity measuring diaphragm whereby no separate measurement has to be made of the separated, i.e., circulating water.

In the boiler constructed in accordance with the principles of the invention, a main feed valve controlled in response to a load is included in the main line for feeding water to the boiler and a valve controlled in response to the level of separated water in the tank is included intermediate the circulating pump and the intermediate point. To enable a precise quantitative control of flow through these valves, smaller by-pass regulating valves are respectively provided connected across the main feed and circulating water valves.

The above mentioned and more specific objects and features of my invention will be apparent from, and will be mentioned in, the following description of the boiler according to the invention shown by way of example in the accompanying drawing in which the sole figure illustrates schematically the flow diagram or circuit diagram of an embodiment in straightline representation.

Referring now to the drawing, the feed water provided from a source (not shown) enters through a conduit into the boiler and passes through a controllable feed pump 1 and a main feed water regulating valve 3 into a high pressure preheater 2. From preheater 2, the preheated feed water is passed through a diaphragm 25, i.e., a feed water flow sensor as is well known in the art, and thence through high pressure preheaters 4 and 5. For convenience, preheaters 2, 4 and 5 may be designated as together constituting the preheating stage of the boiler.

The output of the preheater stage, i.e., the output of preheater 5, in the tube system of which evaporation takes place, essentially steam is produced as shown in the drawing by the heavy line. However, there is still some water contained in this output, the output being supplied to a separator stage 8 which is a water-steam separator vessel. In separator stage 8, the water separated therein drains into a tank 9, the drained water accumulating to a chosen level as is further explained hereinbelow. A circulating line 10 is located in the region of the water level in tank 9 and branches off therefrom, the separated water flowing from tank 9 through a circulating pump 11, a valve 21 and a line 12 to an intermediate point in the preheater stage, i.e., between preheater 2 and feed water flow sensor 25 whereby such intermediate point is located proximal to sensor 25 in relation to the path of feed water flow. Valve 21 is controlled through its connection as shown by the dashed line 22, to a lower water level responsive sensor and, thereby, the separated water level is maintained comparatively constant in tank 9.

Since the line 12 joins the line from preheater 2 at a point proximal to sensor 25, sensor 25 is disposed so as to be able to measure the sum of the feed water and circulating water passing into preheater 4 and consequently there is not required a separate flow sensor of circulating water in the circulating line. Sensor 25 is operatively connected to a feed water supply regulator 27 as shown by the dashed line 26 and which is responsive to the quantity of flow measured by sensor 25. Regulator 27 in turn controls feed pump 1 and valve 3 through an operative connection as shown by dashed line 28.

The main regulator 29 is controlled by a load-responsive transmitter (not shown) and it in turn exercises control over regulator 27 through an operative connection as shown by dashed line 30. Regulator 27 operates to maintain the total of feed and circulating water flow through sensor 25 at a selected substantially constant value for full load operation.

In partial-load or start-up operation the value of the total of feed and circulating water flow through sensor 25 is chosen to be a portion of the full operation value such as about 40%. To cope with a possible emergency overflow situation in tank 9, in addition to the water level regulation provided therein through connection 22, an overflow valve 23 is provided in a line which joins circulating line 10. Valve 23 is controlled in response to another water level-responsive sensor in tank 9, such control being depicted as being effected through line 24. In addition, regulator 27 may receive a signal through a connection 31 which will influence it, if necessary, to effect a further reduction of the water supply passing through sensor 25.

Since feed water regulating valve 3 and circulating water valve 21 are dimensioned to enable flow for full load operation, i.e., full output, even small valve adjusting movements therein may result in large flow variations. Accordingly, smaller by-pass regulating valves 38 and 39 are connected in parallel across valves 3 and 21 respectively to enable a more precise quantitative control of water flow.

The remainder of the boiler comprises superheaters 6 and 7, the latter comprising the super heater stage. Line 32 from superheater 7 is the fresh steam line. To enable temperature regulation of the steam issuing through fresh-steam line 32, water injection points may be provided at point 33 intermediate superheaters 6 and 7 and intermediate superheater 7 and fresh steam line 32 respectively. Water is supplied to points 33 and 34 from the output of preheater 2 through an injection line 37 and injection valves 35 and 36 respectively.

It will be obvious to those skilled in the art, upon studying this disclosure, that boilers according to my invention permit of a great variety of modifications and hence can be given embodiments other than that particularly illustrated and described herein, without departing from the essential features of my invention and within the scope of the claims annexed hereto.

I claim:
1. Force-flow once-through boiler installation comprising a main feed water conduit, a feed pump in said conduit, an evaporator stage, a steam trap and a superheater arranged successively downstream of said feed pump, a water flow sensor connected in said conduit upstream of said evaporator stage for sensing the quantity of water provided to said evaporator stage, a container associated with said steam trap and serving to contain, to a required level, water which has been separated from steam in said steam trap, sensor means for sensing the level of separated water in said container, a circulation conduit connected at one end of said container, in the region of said container where the separated water is accommodated, and connected at the other end to said feed water conduit downstream of said feed pump and upstream of said evaporator stage, a circulation pump provided in said circulation conduit for pumping the separated water away from said container and to said evaporator stage, a valve in said circulation conduit and means for adjusting said valve in dependence upon the water level in said container whereby the water level in said container is regulated, and regulating means responsive to said water flow sensor and to said separated water-level sensor means for regulating the quantity of feed water supplied to said evaporator stage so that the combined quantity of feed water and separated water supplied to said evaporator stage is maintained constant during start-up, shut-down and partial-load operation of the boiler at a value substantially 40% of the quantity of water supplied to said evaporator stage during full-load operation of the boiler.

2. An installation according to claim 1, including a feed regulating valve provided in said feed conduit downstream of said feed pump and upstream of the connection of the circulation conduit to said feed water conduit, said feed regulating valve being operatively connected to said regulating means and actuable thereby for varying the flow of feed water to said evaporator stage, at least one of said feed regulating valves and the valve in said circulation conduit having a bypass regulating valve arranged in parallel therewith.

3. An installation according to claim 1, wherein said valve is downstream of the circulation pump.

4. An installation according to claim 3, wherein said circulation conduit is connected to said feed conduit upstream of said water flow sensor.

5. Method of generating steam using a forced-flow once-through boiler installation including a main feed water conduit, a feed pump in the conduit, an evaporator stage, a steam trap and a superheater arranged successively downstream of the feed pump, a water flow sensor connected in said conduit upstream of said evaporator stage for sensing the quantity of water provided to said evaporator stage, a container associated with the steam trap and serving to contain, to a required level, water which has been separated from steam in the steam trap, sensor means for sensing the level of separated water in said container, a circulation conduit connected at one end to the container, in the region of the container where the water is accommodated, and connected at the other end to the feed water conduit downstream of the feed pump and upstream of the evaporator stage, a circulation pump provided in the circulation conduit for pumping the separated water away from the container and to the evaporator stage, a valve in the circulation conduit and means for adjusting the valve in dependence upon the water level in the container whereby the water level in the container is regulated, which comprises sensing by the water flow sensor the quantity of water provided to said evaporator stage and by the separated water-level sensor means the level of separated water in said container, and regulating the feed water supply in response to the values sensed by the water flow sensor and the separated water-level sensor means, during starting and stopping and in part-load working, so that the total quantity of water passing through the evaporator stage, and composed of feed water and separated water, is kept constant at a predetermined value substantially 40% of the quantity passing through the evaporator stage at full load.

References Cited

UNITED STATES PATENTS 3,194,219   7/1965   Hanzalek _____ 122—406

FOREIGN PATENTS 719,753   12/1954   Great Britain.

OTHER REFERENCES

Mitteilungen Number 1, September, 1956, Published by Dorrwerke Aktiengesellschaft, Ratingen, Germany, Pages 6–8 relied on.

CHARLES J. MYHRE, *Primary Examiner.*